April 14, 1970 A. PFAU ET AL 3,506,788

CROSSPOINT SELECTION CIRCUITS

Filed June 29, 1966 2 Sheets-Sheet 1

CROSSPOINT SELECTION CIRCUITS

Filed June 29, 1966 2 Sheets-Sheet 2

United States Patent Office 3,506,788
Patented Apr. 14, 1970

3,506,788
CROSSPOINT SELECTION CIRCUITS

Anton Pfau, Stuttgart-Zuffenhausen, Gerhard Kohler, Stuttgart-Weilimdorf, and Nikolaus Lewen, Tamm, Germany, assignors to International Standard Electric Corporation, New York, N.Y., a corporation of Delaware Filed June 29, 1966, Ser. No. 561,626
Claims priority, application Germany, July 1, 1965, St 24,062
Int. Cl. H04m 3/22
U.S. Cl. 179—18 7 Claims

ABSTRACT OF THE DISCLOSURE

A switching system is provided which uses crosspoint arrangements in tandem to reduce the requirements for central control facilities. In the system, a first crosspoint arrangement is controlled by a marker and the second crosspoint arrangement is provided with a guidewire network. The marker of the first crosspoint arrangement is used to control seizure of continuing lines with the aid of test potentials, or will select the search wires of the second crosspoint arrangement with the aid of a search potential.

Figure 1:
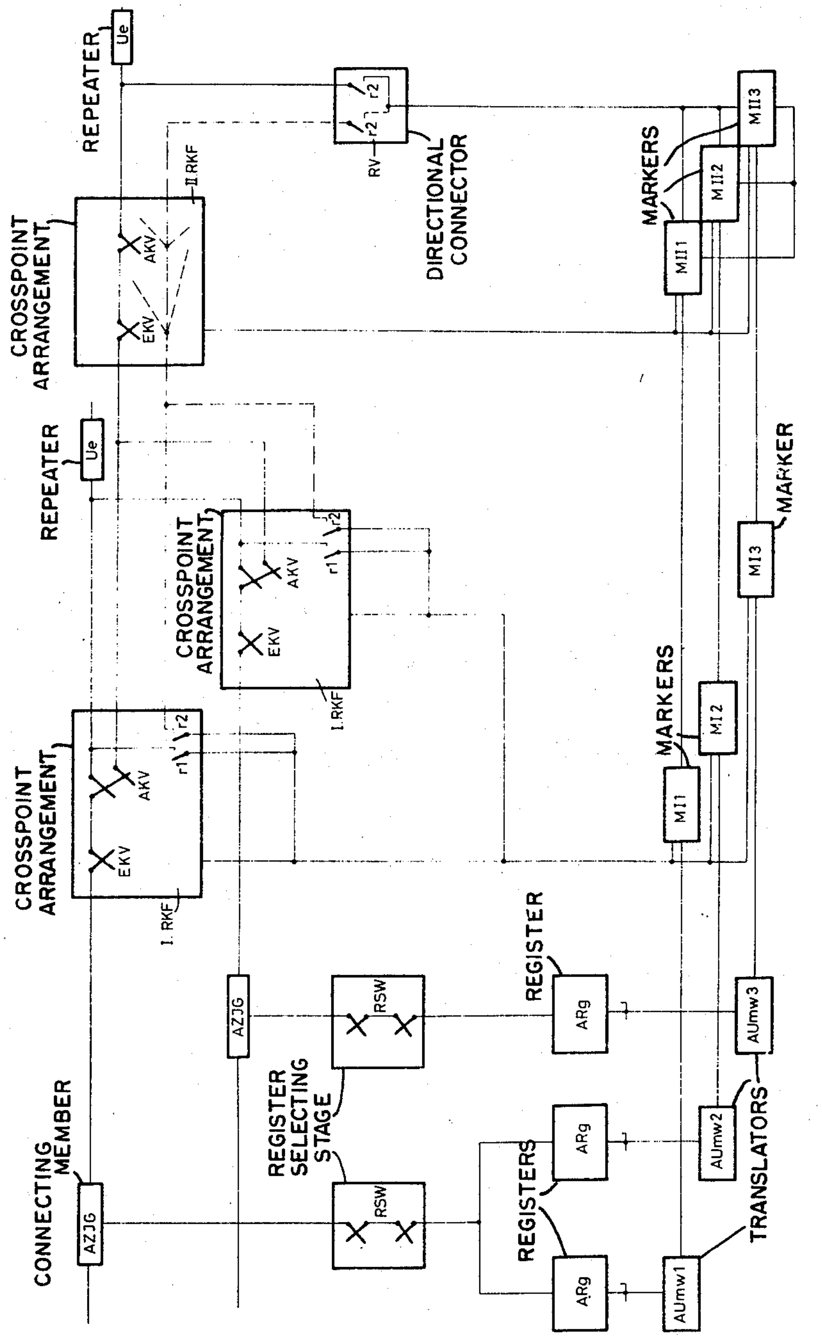

This invention relates to means for selecting the switch paths through a plurality of networks connected in tandem and more particularly to means for selecting paths through either one or more of the tandem networks.

Heretofore, the common controls required to set the switch path have tended to be large and complicated. This is especially true when the switch path is extended through a plurality of the networks.

Accordingly, an object is to reduce the size, quantity, and expense of the common controls. A further object is to provide for the random selection of a switch path through a plurality of tandem connected networks. Yet another object is to complete a connection via only the first network in the tandem connection.

In keeping with an aspect of the invention, a marker controls the selection of the switch path through the first network in the tandem connections. A guide wire, route simulating network controls the selection through the second network in the tandem connection. Depending upon whether the switch path is to be extended through the first or both of the switching networks, either the marker or the guide wire selection principle will be used.

This layout of the control arrangement permits the selective establishment of the various types of connections. A simple switch-over occurs in a directional connector looped into the connections between the markers of the first crosspoint arrangement and the outputs of this crosspoint arrangement. Also, the marker requires only one switch-over from the test potential to a search potential.

The individual crosspoint network may be designed in a two-stage fashion and may be set to include a wide range.

According to the present invention, the marker of the first crosspoint network retains a memory of the idle or busy condition of the intermediate lines extending between the seized or occupied input stage and all of the free or idle output stages. A search or test potential is only applied to those outputs of the output stages having access to free or idle intermediate lines extending to the seized or occupied input stage. In this way, the testing of the continuing lines or the action upon the route search network of the second crosspoint network, can be restricted to paths which are also free and capable of establishing the desired connection.

The route selection in the second crosspoint network is controlled by the route search network. This route searching is initiated when the marker applies an access potential. The setup of the route search network and the selection of the individual stages of the crosspoint network may be carried out in a known manner.

When connections are extended via both of the series-connected crosspoint networks, the access potential appearing at the inputs of the second crosspoint network should have a polarity opposite to the polarity of the test potential of the marker of the first crosspoint network. The route selection may then be carried out via a test chain of the marker in the known manner. The selection does not depend upon the kind of connection, i.e., the same method is used regardless of whether the switch path is completed via the first or via both of the crosspoint arrangements.

Figure 2:
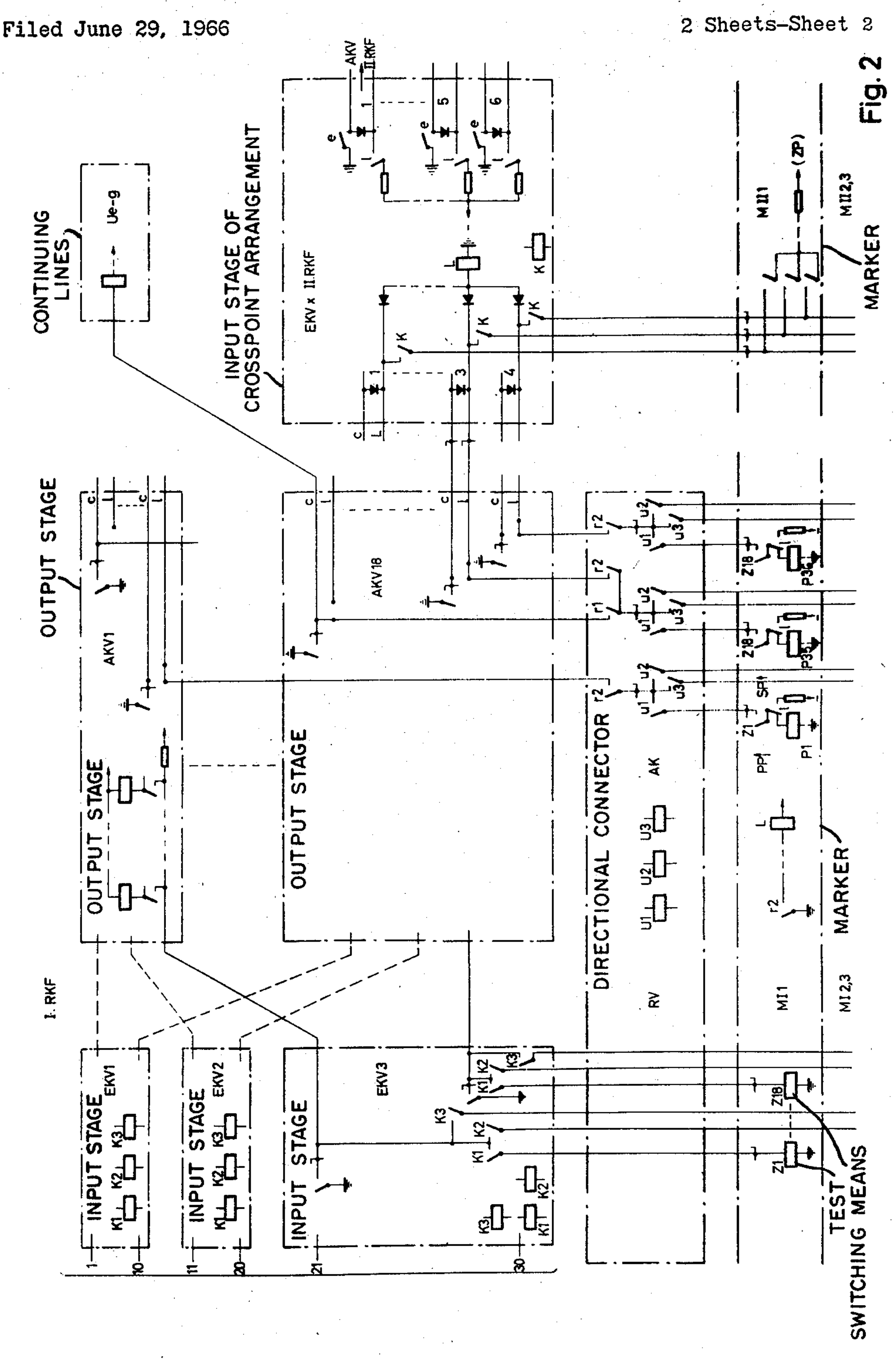

The above mentioned and other features of this invention and the manner of obtaining them will become more apparent, and the invention itself will be best understood by reference to the following description of an embodiment of the invention taken in conjunction with the accompanying drawings, in which:

FIG. 1 shows a basic circuit diagram of a directional switching stage (stage of selection) with two series-connected crosspoint arrangements in which the connections can be selectively established either via the first or via both crosspoint arrangements, and FIG. 2 shows the selecting and test circuits of the cross point arrangements according to FIG. 1 in detail.

As is shown with reference to FIG. 1, the lines to be switched on, terminate at a connecting member AZJG which, besides the connection of a register AR*g* via the register selecting stage RSW, may also take other functions in the course of establishing the connection, etc.

On account of the received dial information in the register AR*g*, the corresponding directional information is derived with the aid of the translators AU*mw*.

In the drawings there are shown three registers AR*g* which may dispose of three different translators AU*mw*1 to AU*mw*3.

The first crosspoint arrangement I.RKF consists of the input stage EKV and of the output stage AKV. To this crosspoint arrangement consisting of several switching groups, there are assigned three markers MI1 to MI3 which, in accordance with the directional information provided by the translators AU*mw*Δ to AU*mw*3, control the establishment of the connection via the first crosspoint arrangement I.RKF.

Via the contacts *r*1 and *r*2 there is denoted the function of the so-called directional connector RV. If a connection is established only via the first crosspoint arrangement I.RKF, then the directional connector is affected in such a way that the contacts *r*1 are actuated. The control leads of the markers MI1 to MI3 are in such a way connected through at the output of the first crosspoint arrangement that they wil be connected to the seizing wires of the continuing lines which are indicated as repeater U*e*. In this way there is effected the application of the normal test potential and the selection of an idle line in this direction.

If a connection is established via both of the crosspoint arrangements I.RKF and II.RKF, then the directional connector or coupler RV is acted upon in such a way that the contacts *r*2 are closed. Via the translator AU*mw*1 to AU*mw*3 both of the crosspoint arrangements are now involved in the establishment of the connection. The marker MI1 to MI3 of the first crosspoint arrangement I.RKF effects a switchover and applies a search potential to the guide wires of the second crosspoint arrangement II.RKF via the control leads connected through by the action of the contacts $r2$. By the marker MII1 to MII3 of the second crosspoint arrangement II.RKF, an access potential is applied to the output connected through via a contact $r2$. Now the establishment of the connection may be effected in a step-by-step manner via the second crosspoint arrangement. First of all, via the marker MII1 to MII3 there is selected an idle path extending via the output stage AKV of the second crosspoint arrangement II.RKF, and to this selected output o fthe input stage EKV there is applied the access potential. In the marker MI1 to MI3 there is disconnected the search potential, and the test potential is applied. The access potential, as offered by the inputs of the rolte search network, is used in this connection as an opposite potential for the test process. Via the test chain of the marker MI1 to MI3 there is then effected the selection of a path. In this way there has also been established the connecting path extending via the first crosspoint arrangement I.RKF. The connecting through of the respective crosspoints is effected in the manner known per se.

With reference to FIG. 2 there are shown details of circuits. In the first crosspoint arrangement I.RKF the two stages EKV and AKV are shown separately. Each stage contains a number of equal switching blocks which are indicated by the references EKV1, EKV2, EKV3, AKV1, AKV18. The design of these switch blocks does not need to be described in detail herein. It might perhaps be useful to mention that each switch block of the output stage is capable of being reached from each switch block of the input stage.

With the aid of the connecting means K1, K2, K3 it is possible to connect the intermediate lines of a switch block of the input stage to the test switching means Z1 to Z18 of the markers MI1 to MI3. As will be easily recognized, the connecting switching means K1 is assigned to the marker MI1, the connecting switching means K2 is assigned to the marker MI2, and so on.

As is not shown in detail with reference to the marker M1, the test chain consisting of the relays P1 to P36 becomes effective with respect to the switch blocks of the output stage AKV via the contacts Z1 to Z18 of the aforementioned test switching means, with the respective intermediate line thereof extending to the busy or engaged switch block EKV3 of the input stage being idle. With the aid of the relays P1 to P36 a test potential PP is applied to the control leads which, in the directional coupler RV, selectively extend to the $c$-wires of the outgoing repeaters U$e$–$g$, which are directly connected to the output of the first crosspoint arrangement, or else a search potential SP is applied to the L-wires extending to the inputs of the route search network of the second crosspoint arrangement.

In cases where the connection is only established via the first crosspoint arrangement, the contacts $r1$ in the directional coupler RV are closed, and the test chain P of the marker MI1 tests the outgoing lines with respect of their condition of occupancy, and then selects an idle line. The setup of the connection from the seized input to the selected output is effected in the manner known per se upon connecting through of the respective crosspoints.

In cases where the connection is established via both crosspoint arrangements, a switchover is effected in the marker MI1 to the control leads. Via the directional coupler there is now energized the relay L of the marker. Contacts 1 apply a search potential SP to the control leads, with this search potential, via the closed contacts $r2$ of the directional coupler RV, being applied to the guide wires L of the route search network of the second crosspoint arrangement II.RKF.

Of the second crosspoint arrangement II.RKF there is only shown the input stage EKV. One relay L of this stage receives the search potential, and via the contacts 1 of this relay the renewed search potential is transferred to the output stage. Both the selection and the connecting through of a connection in the second crosspoint arrangement does not need to be described in detail herein. Care will only have to be taken that the access potential ZP, as applied via the marker MII1, is chosen thus that the potential, as standing on the guide wire inputs L, is capable of being evaluated by the test chain P of the marker MI1.

If the relay L of the marker MI1 is released again, then the selecting process via the test chain P may be performed in the same way as in the case of continuing lines U$e$–$g$. The access potential on the guide wires L corresponds to the unoccupancy potential of the seizing wires $c$ of the outgoing line repeaters U$e$–$g$, which are connected directly to the output of the first crosspoint arrangement I.RKF.

It is still to be noted that also in the directional coupler or connector, the control leads are only connected through to one marker MI1 to MI3. This discrimination is performed by the relays U1, U2 and U3.

In the chosen example of embodiment the busy condition is indicated by the application of ground (plus) potential, as may be recognized from the various contacts at the seizing wires $c$ and the guide wires L. Likewise, also, the holding of the crosspoints is effected in the manner known per se and, consequently, independently of the course of the connection, via the first or via both crosspoint arrangements.

We claim:

1. An automatic switching system comprising two tanden connected networks, means for establishing paths through either one or both of said networks, marker means associated with the first of said networks for selecting a path through said first network, guide wire network simulating means associated with the second of said networks, interconnection means joining said networks, and means responsive to indications that tandem network paths have been extended to the outlet of said first network for applying end-marking potentials to said guide wire simulation network.

2. The system of claim 1 and means coupled between said marker means and the outlets of said first network for establishing paths through both of said networks.

3. The system of claim 1 wherein each of said networks comprises two cascaded stages.

4. The system of claim 1 and a second marker means associated with said second network, and means including said second marker for applying path control signals to said guide wire network.

5. The system of claim 1 and means for determining the idle or busy conditions of individual lines in said interconnection means in said marker means, and means for restricting the application of end-marking potentials at the outlets of said second network to those paths having an idle inlet.

6. The system of claim 1 wherein the ends of paths extended through said first network to said interconnecting means are marked with potentials of a first polarity, and means for applying the adjacent end-marking potential to said second network by the opposite polarity.

7. The system of claim 1 wherein said guide wire network is separate from any associated speech wires.

References Cited

UNITED STATES PATENTS 3,310,633 3/1967 Schonemeyer.

WILLIAM C. COOPER, Primary Examiner